Figure 1:
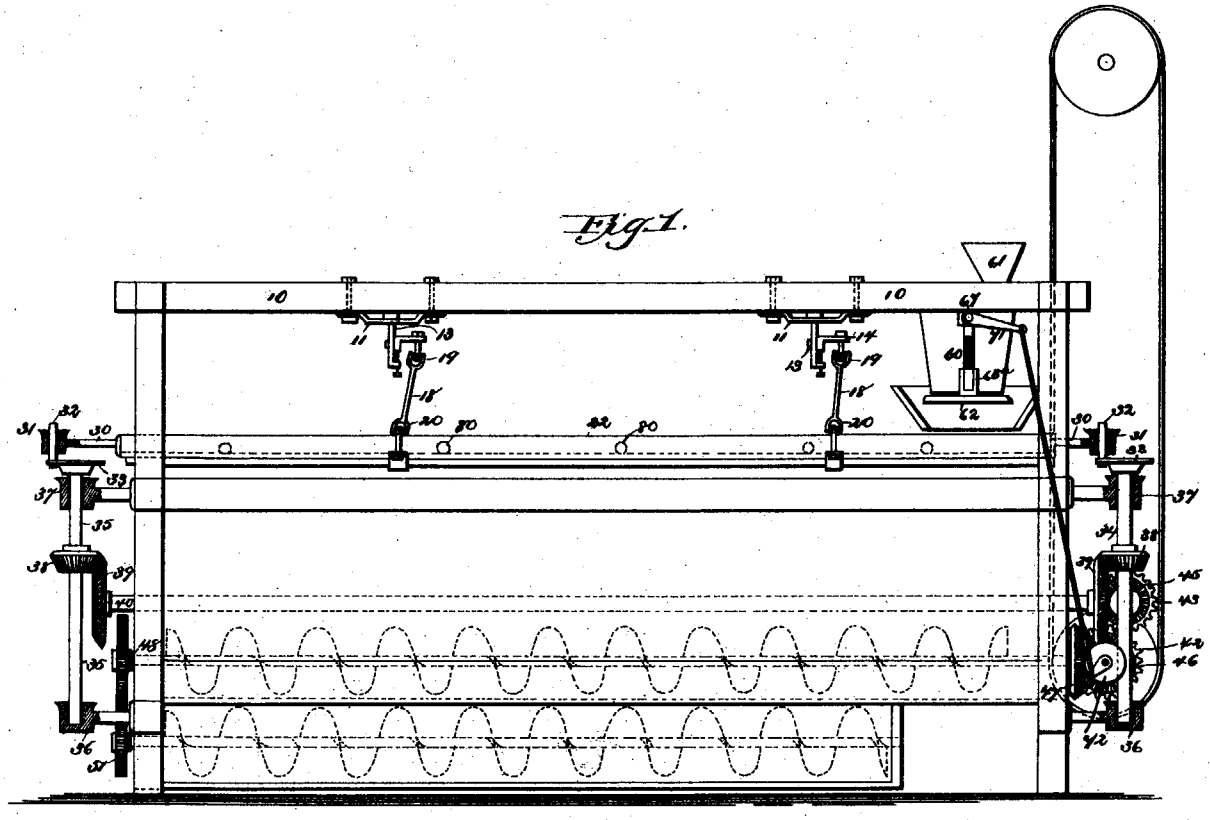

2 Sheets—Sheet 1.

J. JOHNSTON.

FLOUR BOLT.

No. 11,117. Reissued Oct. 14, 1890.

Witnesses:

Wm. M. Rheem.

O. Wurdemann

Inventor:

John Johnston, By his Attorneys,

Butterworth, Hall & Brown

THE NORRIS PETERS CO., PHOTO-LITHO., WASHINGTON, D. C.

J. JOHNSTON.
FLOUR BOLT.
No. 11,117. Reissued Oct. 14, 1890.
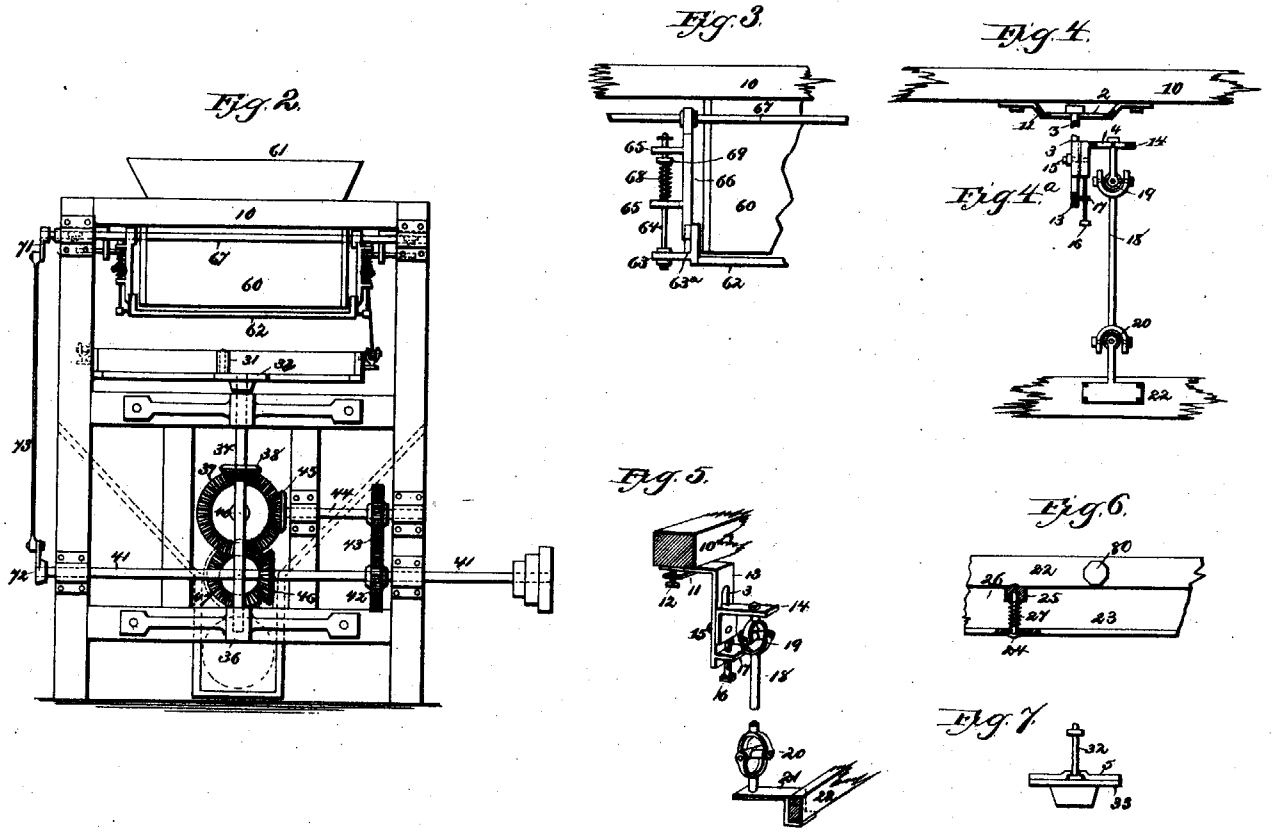
Witnesses:
Wm. M. Rheem
E. Wurdemann
Inventor:
John Johnston by
his attorneys
Butterworth Hall & Brown
THE NORRIS PETERS CO., PHOTO-LITHO., WASHINGTON, D. C.

UNITED STATES PATENT OFFICE.

JOHN JOHNSTON, OF NEENAH, WISCONSIN.

FLOUR-BOLT.

SPECIFICATION forming part of Reissued Letters Patent No. 11,117, dated October 14, 1890.

Original No. 403,757, dated May 21, 1889. Application for reissue filed August 15, 1890. Serial No. 362,119.

*To all whom it may concern:*

Be it known that I, JOHN JOHNSTON, of Neenah, in the county of Winnebago and State of Wisconsin, have invented a new and Improved Flour-Bolt, of which the following is a full, clear, and exact description.

This invention relates to flour-bolts; and it consists in the novel features hereinafter described and claimed.

Reference is to be had to the accompanying drawings, forming a part of this specification, in which similar figures of reference indicate corresponding parts in all the views.

Figure 1 is a side view of my improved flour-bolt, parts being shown in section. Fig. 2 is an end view of the same. Fig. 3 is an enlarged detail view illustrating the construction of the adjustable feeding device. Fig. 4 is an enlarged detail view, in partial section, illustrating the construction of the upper portion of the bolt-hanging attachments; and Fig. 4[A] is a similar view of the lower portion of the same, but in a position at right angles to Fig. 4. Fig. 5 is a perspective view of the construction illustrated in Figs. 4 and 4[A]. Fig. 6 is a sectional detail view illustrating the construction of the bolting-frame, one of the clearing-balls used in connection with said frame being represented in connection therewith; and Fig. 7 is a detail view of one of the crank-disks.

In the drawings, 10 represents the main frame of the machine, to the upper portion of which frame there are secured four brackets 11, formed with longitudinal slots 2, adapted to receive bolts 12, which bolts engage with hanger-arms 13, said arms extending inward at right angles to the longitudinal strips of the frame 10 to be carried downward in perpendicular lines, the perpendicular sections of the arms being slotted, as shown at 3, to provide for the adjustable connection of the hanger-brackets proper, which are shown at 14, said hanger-brackets being secured to the perpendicular sections of the arms 13 by bolts 15, and in order that there may be a direct support for the hanger-brackets I provide set-screws 16, which engage with apertures that are formed in lugs or ears 17, that extend inward from the perpendicular sections of the arms 13.

The hanger-brackets 14 are slotted at 4 to provide for the adjustment toward or from the main frame of the hangers 18, which said hangers are provided with upper universal joints 19 and lower universal joints 20, the lower sections of the joints 20 being connected to brackets 21, that are secured to the sides of the sieve-frame 22. This sieve-frame 22 is provided with three slats 23, that are apertured to provide for the passage of the screws 24, which engage with blocks 25, that are secured to the bolting-cloth 26, the cloth being normally upheld by springs 27, that are coiled about the screws 24 and abut against the slats 23 and the blocks 25, this arrangement permitting a certain depression or lowering of the cloth, but preventing any upward movement beyond the normal line.

To each end of the sieve-frame 22, I secure arms 30, the ends of which are provided with sockets 31, that are adapted to receive crank-pins 32, said pins being mounted in slides 5, that are formed in the crank-disks 33. Said crank-disks 33 are carried by vertical shafts 34 and 35, which shafts are stepped in bearings 36 and guided by upper bearings 37. The shafts 34 and 35 carry beveled pinions 38, that engage with bevel-gears 39, carried by a shaft 40.

Across the end of the machine the main driving-shaft 41 is mounted, and this shaft carries a spur-gear 42, which engages a smaller spur-gear 43, that is carried by an upper shaft 44, which said upper shaft in turn carries a bevel-pinion 45, that engages the bevel-gear 39, so that as the shaft 41 is revolved motion will be transmitted therefrom to the shaft 40 and from said shaft to the shafts 34 and 35, thus imparting a similar motion to said shafts 34 and 35. The shaft 41 also carries a bevel-gear 46, which engages a similar gear 47, that is carried by an upper conveyer-shaft 48, this shaft 48 carrying a gear 50, which engages a gear 51, that is carried by a lower conveyer-shaft.

Above the sieve-frame I mount a feeder 60, which is fed from a hopper 61, and beneath this feeder I adjustably mount a swinging plate 62, said plate being provided with lugs 63, which hold upwardly-extending rods 64, that pass through apertured lugs 65 formed upon arms 66, that are rigidly connected to a rock-shaft 67. Between the lugs 65, I arrange springs 68, one end of these springs abutting against the lower lugs, while the upper ends abut against adjusting-nuts 69, the arrangement being such that by turning down the nuts the tension of the springs will be increased and the plate 62 will be held closer to the bottom of the feeder-box.

To the end of the shaft 67, I connect a crank-arm 71, and this crank-arm in turn is connected by a rod 73 with a crank-arm 72, that is carried by the shaft 41, the crank-arm 72, however, being much shorter than the arm 71, so that as the shaft 41 is revolved a partial rotary motion will be imparted to the shaft 67. In order that the sieve may be cleared, I place upon it a number of polygonal balls 80, the number of these balls varying with the character of the material that is being operated upon.

By mounting the sieve as above described I provide for the movement of the sieve in any direction desired, and thus render it possible for the sieve to be carried to and fro in an elliptical path when the shafts 34 and 35 are revolved; and by making the hanger-connections as above described I provide for a proper adjustment of the sieve-frame, and by adjustably connecting the crank-pins to their disks I am able to vary the path through which the sieve is carried to meet the requirements of the particular material that is to be operated upon.

In a companion application, Serial No. 255,404, on which Patent No. 403,675, dated May 21, 1889, was granted me, I show and describe a shaking bolt having some of the general features of this. In said application I have claimed the swinging hopper apron or plate more broadly than in this, and also claimed specifically the different means therein shown and described for suspending and adjusting said apron or plate. I have likewise described and claimed means for imparting a circular or elliptical movement to the sieve.

Having fully described my invention, I claim as new and desire to secure by Letters Patent—

1. In a flour-bolt, the combination of the main frame with the sieve-frame, hangers connected with said frames, each hanger having a universal joint and provided with means for vertical, longitudinal, and lateral adjustment, and means for imparting horizontal circulatory motion to said sieve-frame, all as substantially shown.

2. In a flour-bolt, the combination of the main frame with the sieve-frame, hangers connected with said frames, each hanger having a universal joint, slotted brackets and bolts arranged for longitudinal, vertical, and lateral adjustment of said hangers, and means for imparting a horizontal circulatory motion to said sieve-frame, all as substantially shown.

3. The combination of the frame 10, the slotted brackets 11, the bolts 12, the angular arms 13, having their horizontal arms supported by said bolts and having their vertical arms slotted and provided with lugs 17, having vertical set-screws 16, the angular brackets 14, adjustable on the slotted arms above the set-screws on which they rest, and the sieve having brackets 21 on its sides, with the hangers 18, provided with universal joints connecting them to the brackets 14 and 21, respectively, substantially as set forth.

4. The combination, in a flour-bolt, with a feeder, of depending swinging arms at opposite sides thereof, a plate at the lower ends of said arms, vertically-movable connections between said plate and arms, springs allowing a yielding movement between the arms and connections, and means for oscillating said plate, substantially as set forth.

5. The combination, with a feeder, of the depending slotted swinging arms at opposite sides thereof provided with outward projecting side lugs, a plate extending under the discharge end of the feeder provided with rods extending upwardly through the said lugs and sliding freely therein, and lugs 63[a], engaging the slotted arms, and the springs supporting the rods yieldingly, substantially as set forth, 6. In a flour-bolt, the combination, with the sieve and its frame, of the apertured slats extending across the under side of said frame, blocks on the under side of the sieve, screws or pins extending from said blocks down through the slat-apertures, and springs on said screws or pins, substantially as set forth.

7. In a flour-bolt, the combination, with the sieve having blocks on its under surface and the frame to which the sieve is secured having apertured slats on its lower side, of the headed screws passing up through the apertures in the slats into the said blocks, the heads of the screws resting against the lower surfaces of said slats and limiting the upward movement of the screws and sieve, and the springs on the screws between the blocks and slats, substantially as set forth.

JOHN JOHNSTON.

Witnesses:
OLE O. MYHRE,
E. JOHNSON.